(12) United States Patent
Bergami

(10) Patent No.: US 11,414,204 B2
(45) Date of Patent: Aug. 16, 2022

(54) AIR INTAKE UNIT FOR AN AIRCRAFT ENGINE

(71) Applicant: BMC S.R.L., Medicina (IT)

(72) Inventor: Gaetano Bergami, Medicina (IT)

(73) Assignee: BMC S.R.L., Medicina (IT)

( * ) Notice: Subject to any disclaimer, the term of this patent is extended or adjusted under 35 U.S.C. 154(b) by 426 days.

(21) Appl. No.: 16/499,092

(22) PCT Filed: Mar. 30, 2018

(86) PCT No.: PCT/IB2018/052233
§ 371 (c)(1),
(2) Date: Sep. 27, 2019

(87) PCT Pub. No.: WO2018/178948
PCT Pub. Date: Oct. 4, 2018

(65) Prior Publication Data
US 2021/0078716 A1    Mar. 18, 2021

(30) Foreign Application Priority Data
Mar. 30, 2017    (IT) .................. 102017000035341

(51) Int. Cl.
*B64D 33/02* (2006.01)
*F02C 7/052* (2006.01)
(Continued)

(52) U.S. Cl.
CPC .............. *B64D 33/02* (2013.01); *F02C 7/05* (2013.01); *F02C 7/052* (2013.01); *F02C 7/057* (2013.01);
(Continued)

(58) Field of Classification Search
CPC .............. B64D 33/02; B64D 2033/022; B64D 2033/0246; B64D 2033/0286;
(Continued)

(56) References Cited

U.S. PATENT DOCUMENTS 3,016,109 A    1/1962  Howard
3,483,676 A    12/1969 Sargisson
(Continued)

FOREIGN PATENT DOCUMENTS

EP    3121414 A1    1/2017
EP    3121416 A1    1/2017

OTHER PUBLICATIONS

International Search Report and Written Opinion in corresponding PCT Application No. PCT/IB2018/052233, dated Jun. 11, 2018. 10 pages.

*Primary Examiner* — Steven M Sutherland
(74) *Attorney, Agent, or Firm* — Leason Ellis LLP

(57) ABSTRACT

An air intake unit for an engine of an aircraft; the intake unit has: a tubular housing; a first inlet opening which is obtained through an outer wall of the tubular housing and through which external air can be taken in; an air filter which engages the first inlet opening; a second inlet opening which is obtained through the outer wall of the tubular housing and through which external air can be taken in; a shutter device which is coupled to the second inlet opening and is movable between a closed position, in which it closes the second inlet opening, and an open position, in which it sets the passage through the second inlet opening free; and an actuator, which moves the shutter device.

17 Claims, 14 Drawing Sheets

(51) Int. Cl.
*F02C 7/05* (2006.01)
*F02C 7/057* (2006.01)

(52) U.S. Cl.
CPC .......... *B64D 2033/0246* (2013.01); *B64D 2033/0253* (2013.01); *B64D 2033/0286* (2013.01); *F05D 2220/323* (2013.01); *F05D 2220/329* (2013.01)

(58) Field of Classification Search
CPC ....... B64D 2033/0253; F05D 2220/323; F05D 2220/329; F02C 7/04; F02C 7/05; F02C 7/052; F02C 7/057
See application file for complete search history.

(56) References Cited

U.S. PATENT DOCUMENTS

| | | |
|---|---|---|
| 2013/0092798 A1 | 4/2013 | Boyce |
| 2018/0106224 A1* | 4/2018 | Dionne ................... F02C 7/04 |
| 2018/0208323 A1* | 7/2018 | Parsons ................ B64D 33/02 |
| 2018/0305035 A1* | 10/2018 | Bergami ................ F02C 7/042 |

\* cited by examiner

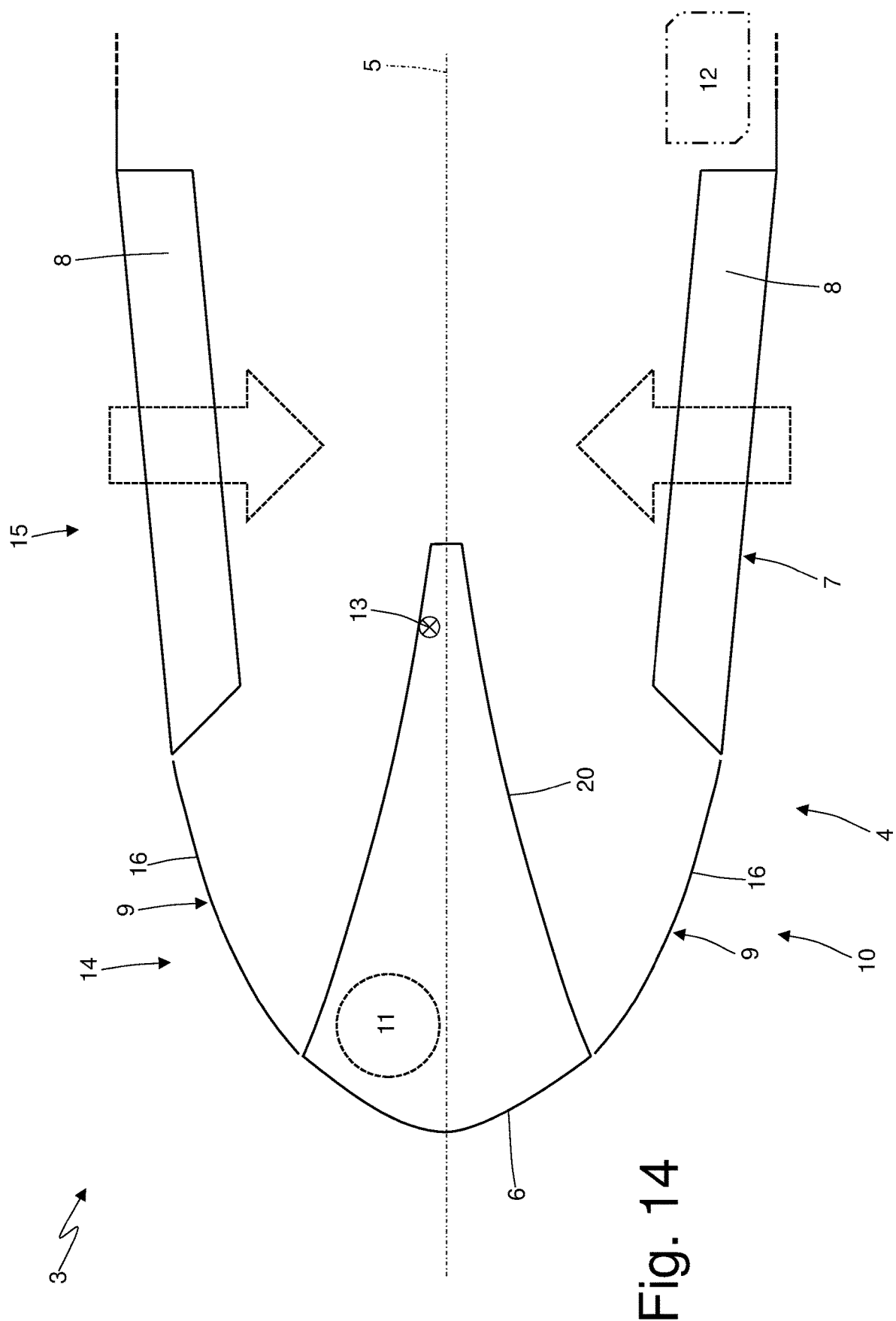

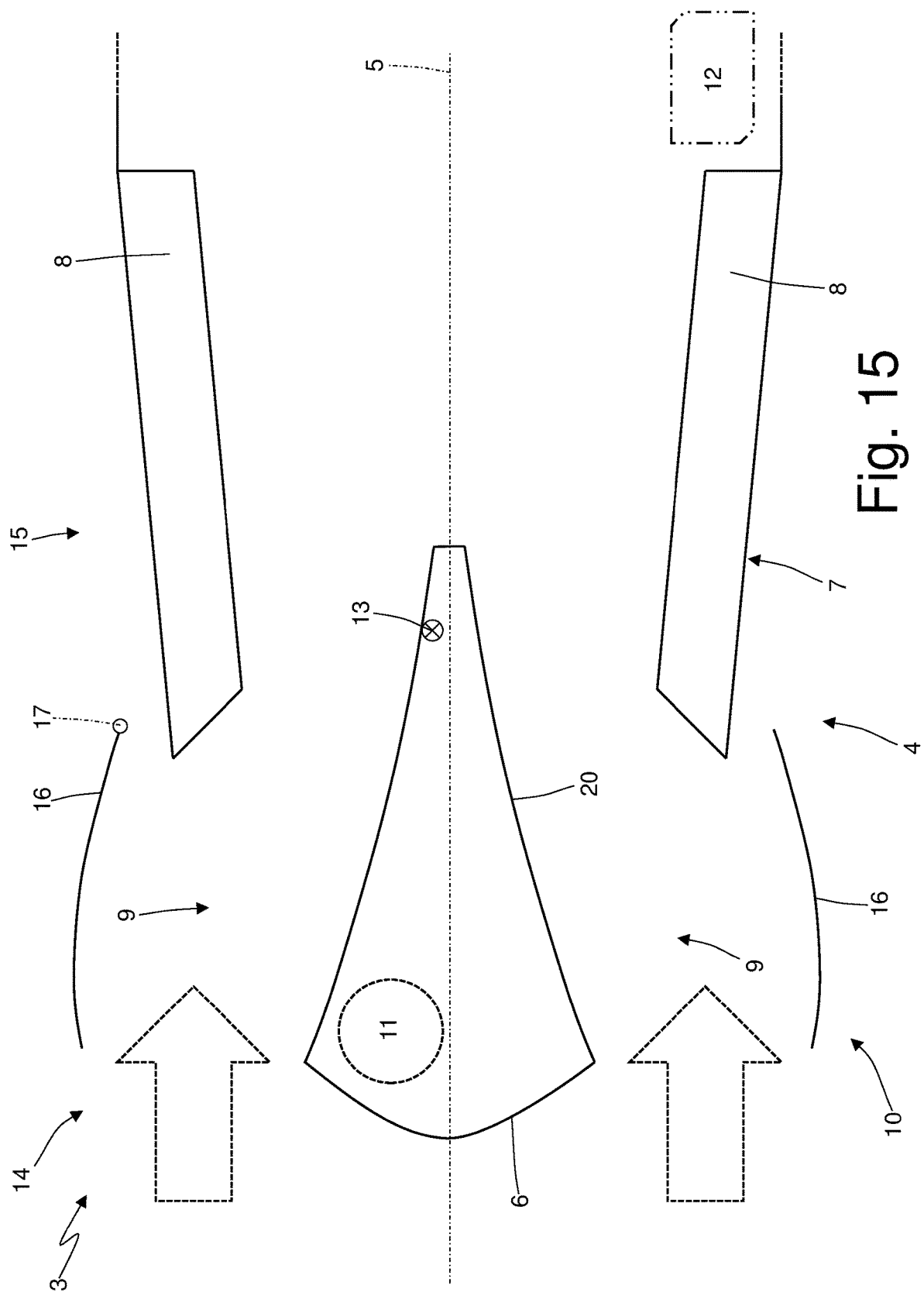

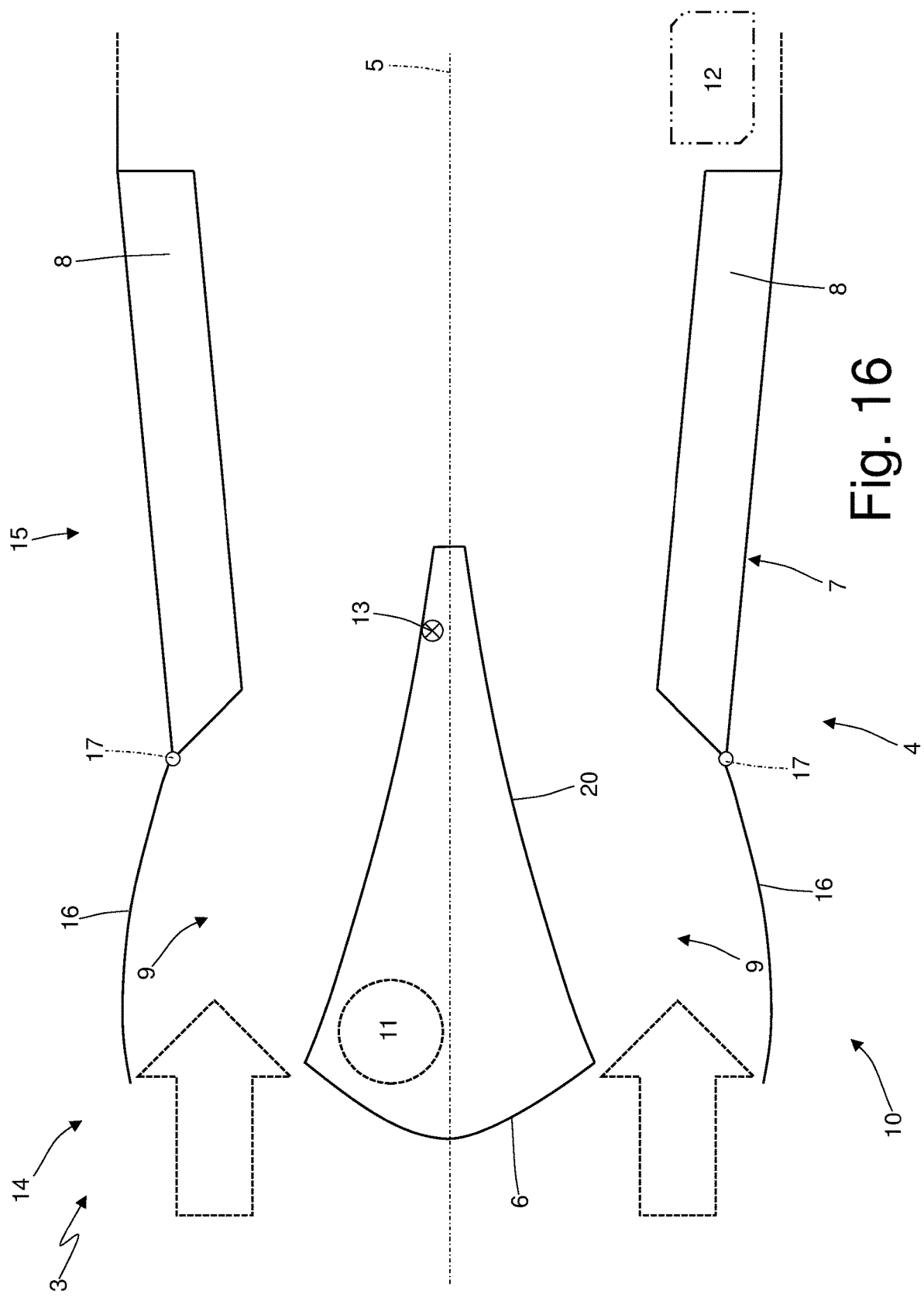

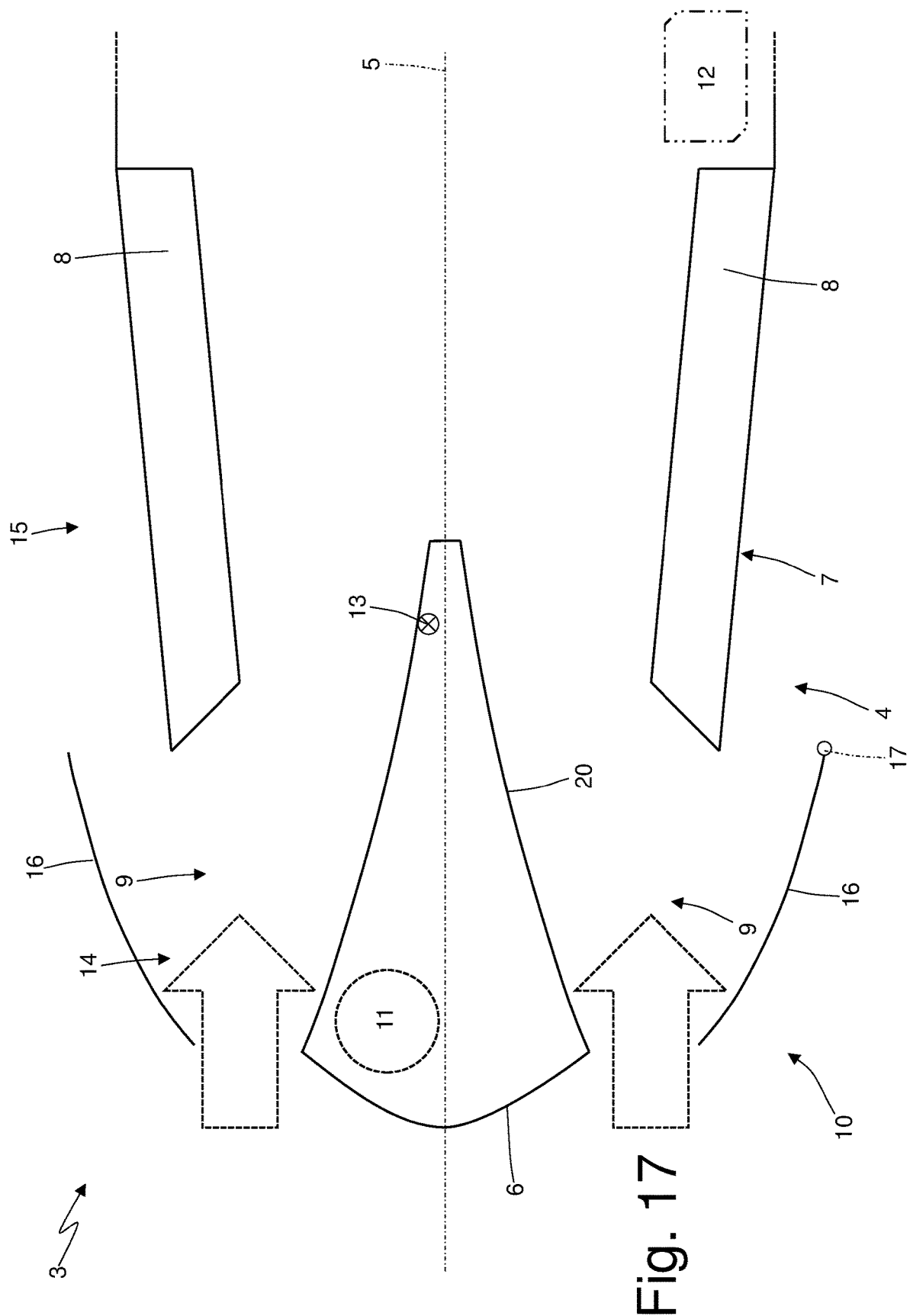

AIR INTAKE UNIT FOR AN AIRCRAFT ENGINE

CROSS REFERENCE TO RELATED APPLICATIONS

This application is a U.S. National Phase application under U.S.C. § 371 of International Patent Application No. PCT/IB2018/052233, filed Mar. 30, 2018, which claims priority from Italian Patent Application No. 102017000035341 filed on Mar. 30, 2017 the disclosure of which is incorporated by reference.

TECHNICAL FIELD

The invention relates to an air intake unit for an engine of an aircraft, namely a machine built by mankind, which can stand and move in the air enabling the transportation of people or objects in the Earth's atmosphere.

The invention finds advantageous application in a helicopter, to which explicit reference will be made in the description below without because of this loosing in generality.

PRIOR ART

A modern helicopter generally is provided with at least one turbine engine, which operates a complex of blades, which allow the helicopter to lift and lower itself in a vertical direction, stand still while flying, move to the side, forward and backward. The turbine engine has, at the front, an air intake, through which the turbine engine sucks in the external air needed to operate (namely, the external air containing the oxygen needed for the combustion).

Generally speaking, the air intake can comprise a metal grid with relatively large meshes (in the range of one or two centimetres), which fulfils the function of preventing birds from flying into the air intake. More rarely, between the air intake and the turbine engine there is arranged an air filter having the function of filtering the air taken in, so as to hold back small-sized impurities (dust or the like), which, in the long term, can cause an early wear of the turbine engine. The use of the air filter generally is avoided, as the air filter causes load losses, which have a significant negative impact on the performances of the turbine engine, and has proven to be useful only close the ground; as a matter of fact, impurities tend to move downwards due to gravity and, therefore, they can be present in the air only in proximity to the ground, whereas at certain heights (i.e. beyond 50-70 metres from the ground) the air is completely free from impurities. As a consequence, the air filter is mounted only when the helicopter must operate (especially take off or land) in areas with a lot of dust, for example in desert areas.

However, the absence of the filter has proven to generally determine higher maintenance costs for the engine, due to the greater wear provoked by the presence of foreign bodies in the combustion chamber during take-off and landing (namely when the helicopter is close to the ground). As a matter of fact, even when the helicopter takes off and lands in heliports (with asphalt surfaces or the like), air currents generated by the rotation of the blades inevitably lift and spread around impurities (basically dust and small debris), which are always present in the external environment.

Patent application US2013092798A1 describes an air filter for helicopters with a cylindrical shape and provided, at the front, with a front portion, which is ogive-shaped and is axially movable between a closed position (in which it prevent air from flowing through a bypass air intake with an annular shape) and an open position (in which is allows air to flow through the bypass air intake). In other words, when the front portion is arranged in the front position, air can flow through the bypass air intake, thus avoiding flowing through the filtering material.

U.S. Pat. No. 3,483,676A1 describes another air filter for helicopters with the shape of a truncated cone and provided, at the front, with a bypass air intake regulated by a movable door controlled by a motor-driven actuator; when the door is opened, air can flow through the bypass air intake, thus avoiding flowing through the filtering material.

U.S. Pat. No. 3,016,109A describes an air filter for helicopters, i.e. a filter for filtering air to be admitted to the inlet of a powerplant of an helicopter.

DESCRIPTION OF THE INVENTION

The object of the invention is to provide an air intake unit for an aircraft engine, which allows the aircraft to safely operate even in areas with a lot of dust, without causing, at the same time, a reduction of the performances.

According to the invention, there is provided an air intake unit for an engine aircraft according to the appended claims.

The appended claims describe preferred embodiments of the invention and form an integral part of the description.

BRIEF DESCRIPTION OF THE DRAWINGS

The invention will now be described with reference to the accompanying drawings, which show a non-limiting embodiment thereof, wherein:

FIG. 14 is a schematic view, with a longitudinal section, of a different embodiment of the air intake unit of FIG. 1 with a shutter device in a closed position; and FIGS. 15, 16 and 17 are three schematic views, with longitudinal sections, of the air intake unit of FIG. 14 with the shutter device in an open position and according to three respective variants.

PREFERRED EMBODIMENTS OF THE INVENTION

Figure 2:
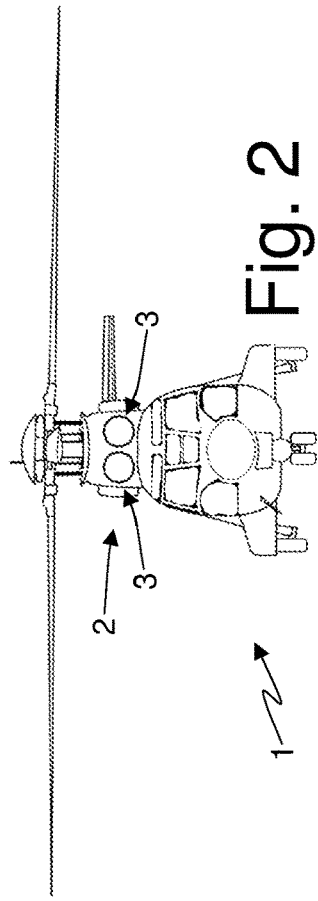
FIGS. 1, 2 and 3 are schematic views, namely a side, a front and a top view, respectively, of a helicopter provided with a pair of twin turbine engines provided with corresponding air intake units according to the invention.
Figure 1:
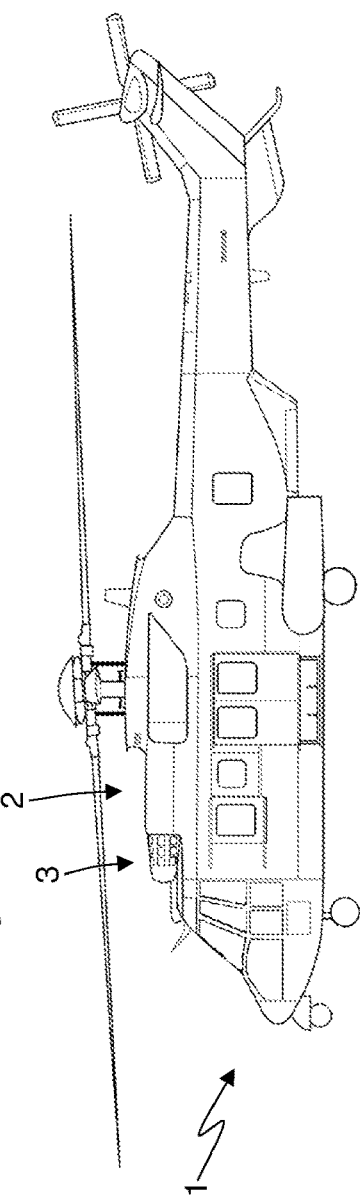
Figure 3:
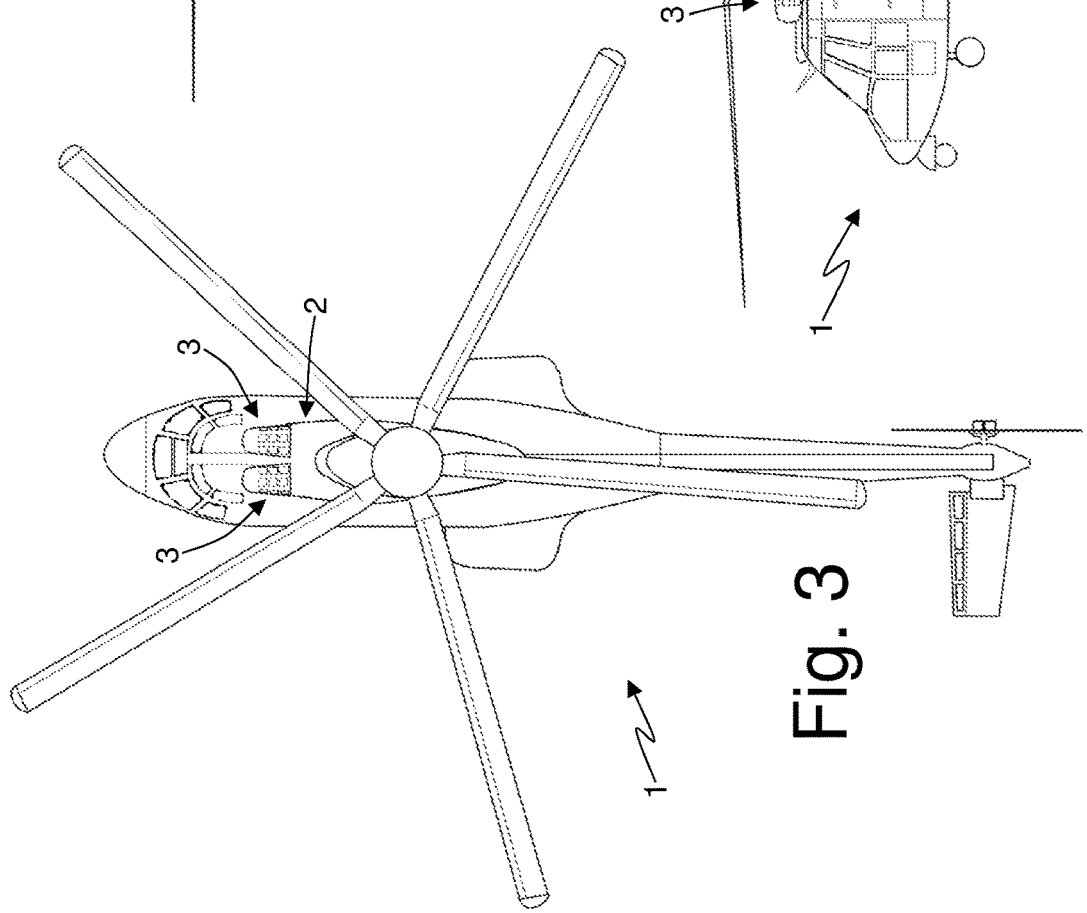

In FIGS. 1, 2 and 3, number 1 indicates, as a whole, a helicopter comprising two twin turbine engines 2, which operate a complex of blades, which allow the helicopter to lift and lower itself in a vertical direction, stand still while flying, move to the side, forward and backward.

Each turbine engine 2 comprises a tubular housing having, at the front, an air intake opening (through which the turbine engine 2 takes in the external air needed to operate, i.e. the external air containing the oxygen needed for the combustion) and, at the back, an air outlet opening (through which the turbine engine 2 expels the exhaust gases produced by the combustion). In the area of the air inlet opening of each turbine engine 2 there is an air intake unit 3, through which the air taken in by the turbine engine 2 flows.

Figure 4:
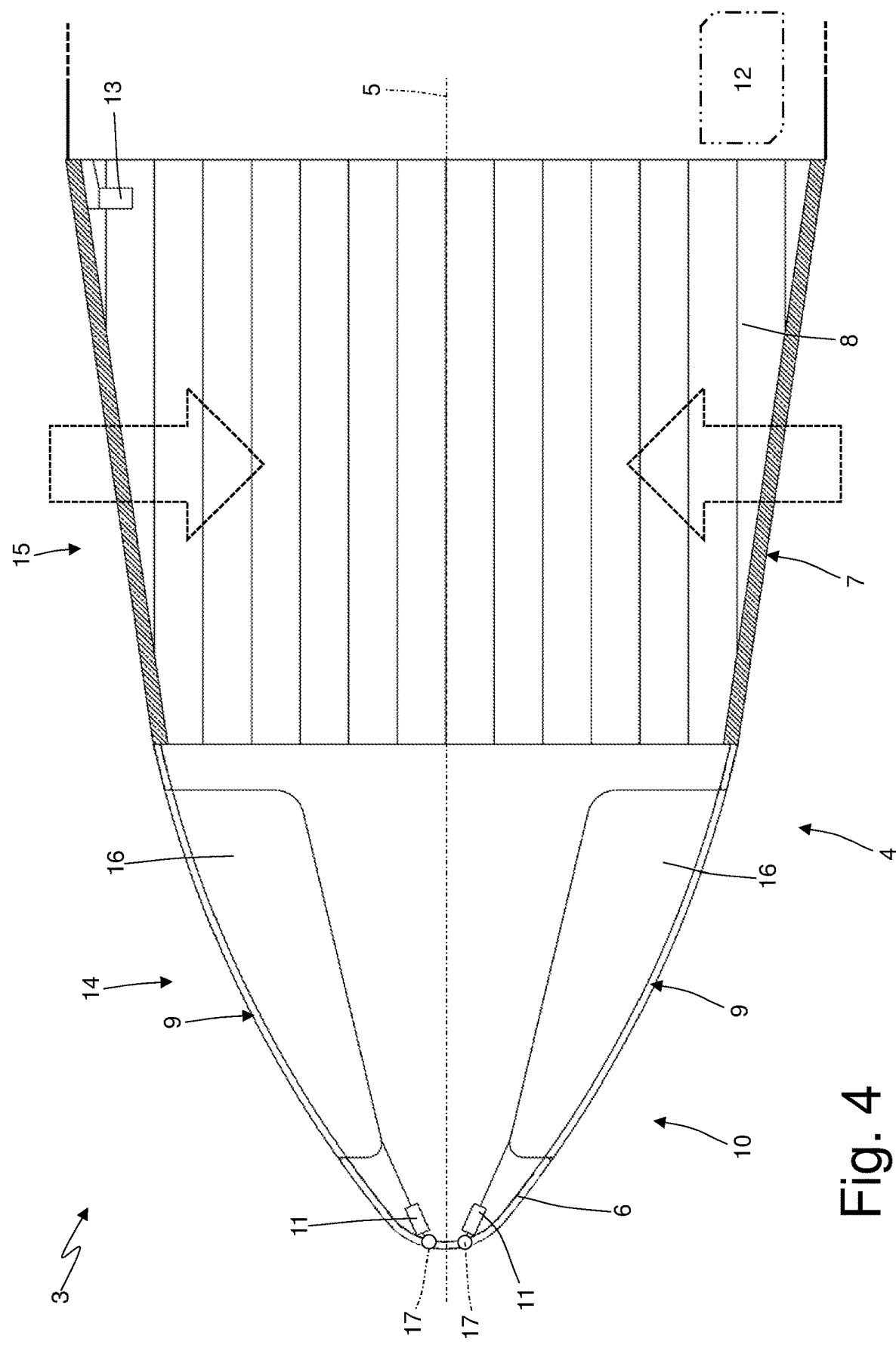
FIG. 4 is a schematic view, with a longitudinal section, of an air intake unit of FIG. 1 with a shutter device in a closed position.
Figure 5:
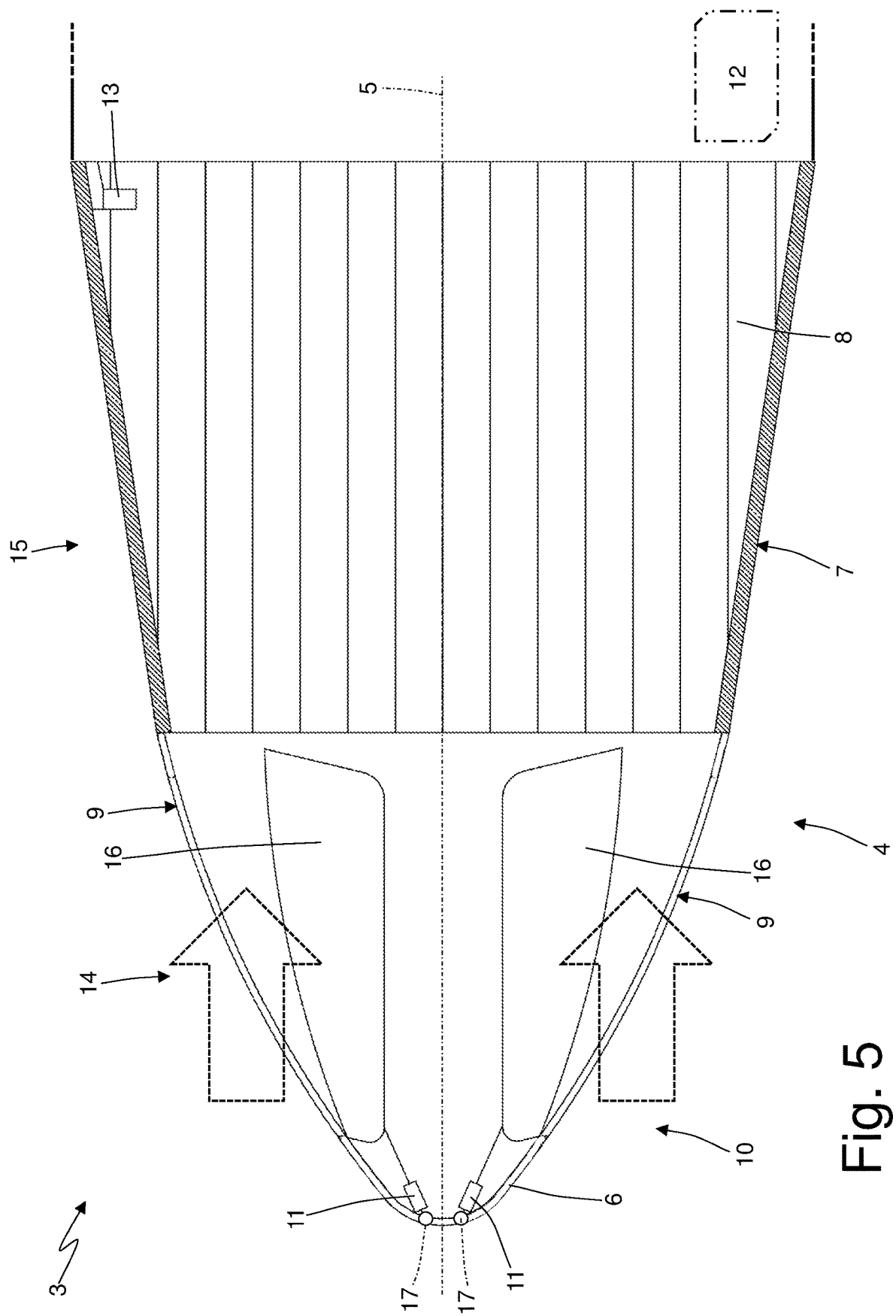
FIG. 5 is a schematic view, with a longitudinal section, of the air intake unit of FIG. 4 with the shutter device in an open position.
Figure 6:
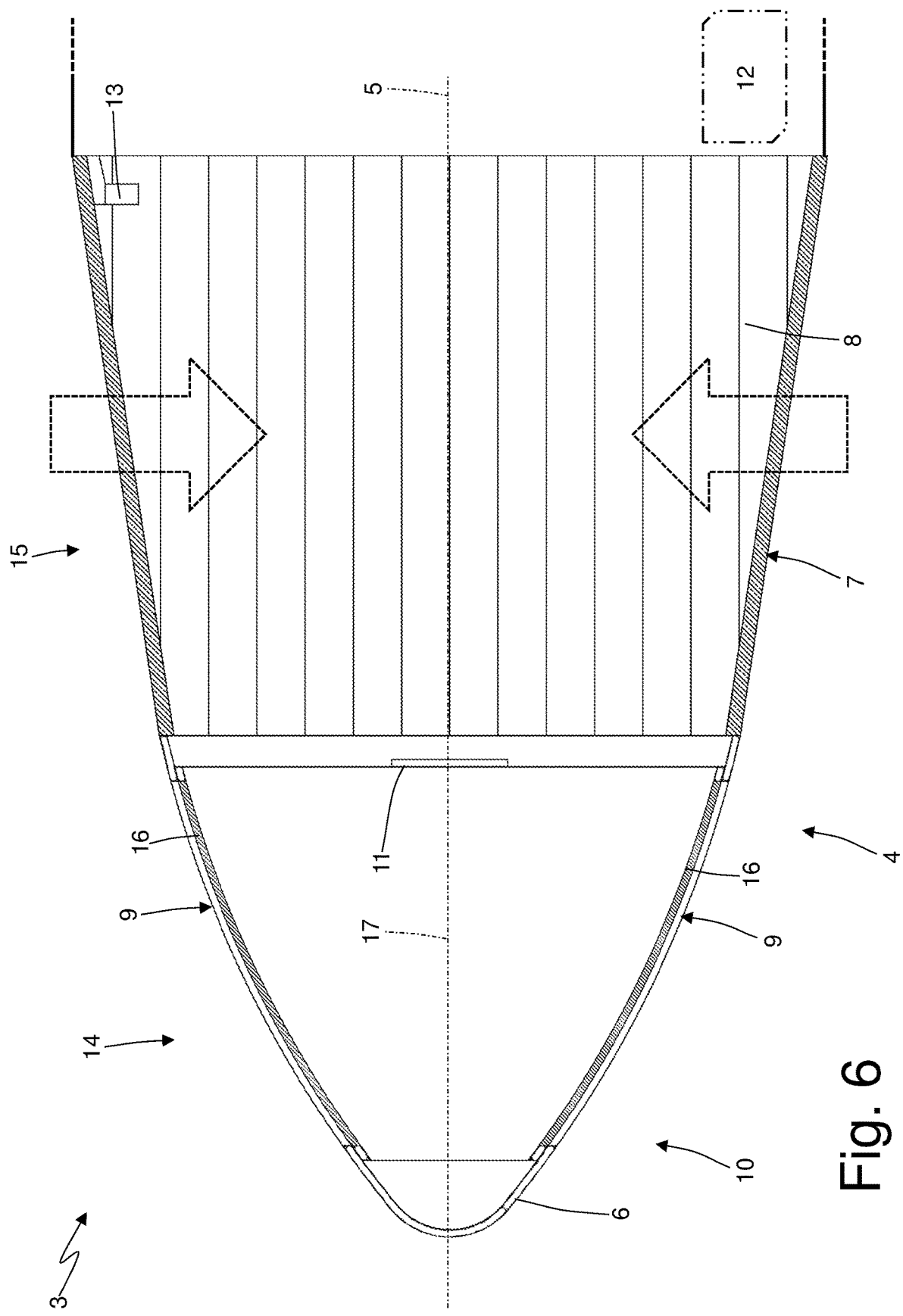
FIG. 6 is a schematic view, with a longitudinal section, of an alternative embodiment of the air intake unit of FIG. 4 with the shutter device in a closed position.
Figure 7:
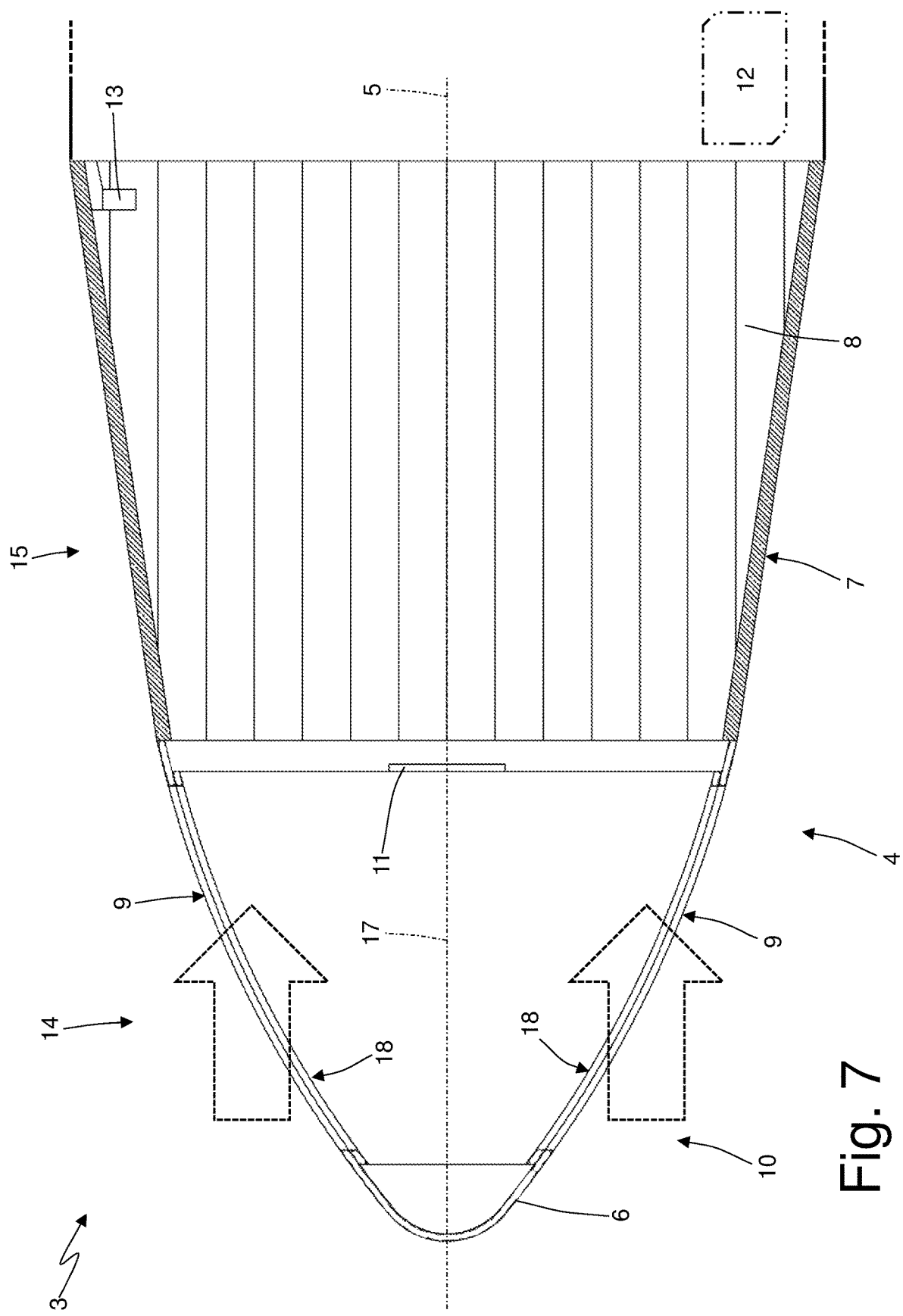
FIG. 7 is a schematic view, with a longitudinal section, of the air intake unit of FIG. 6 with the shutter device in an open position.
Figure 9:
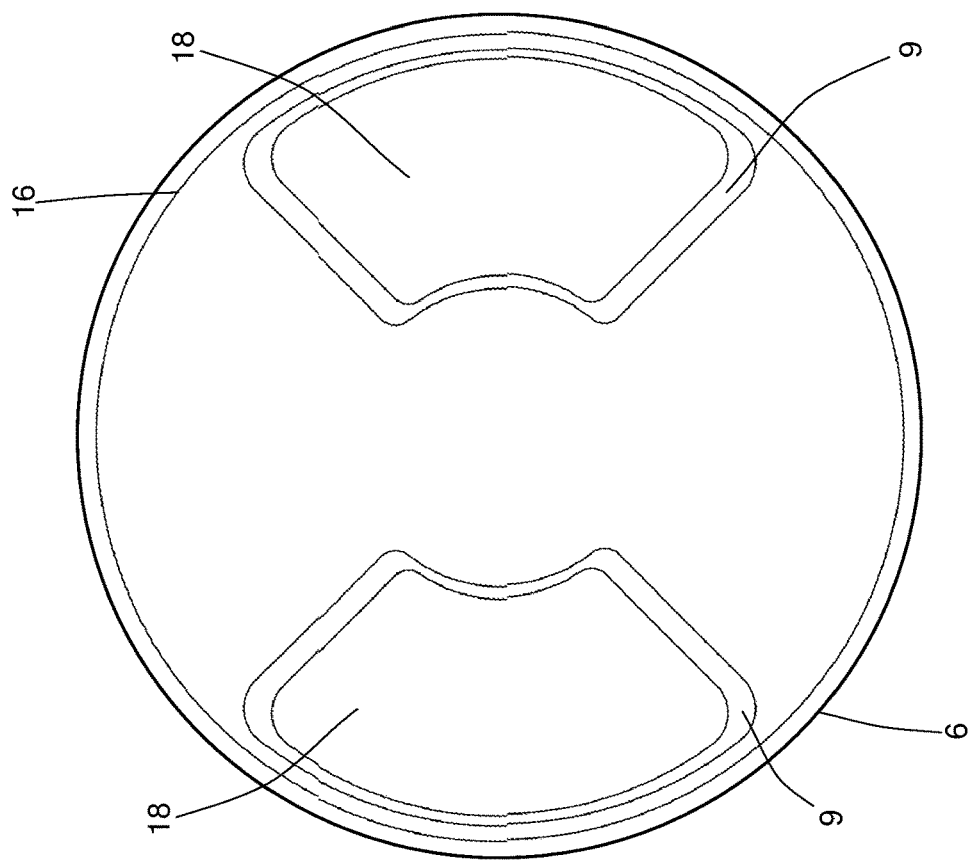
FIGS. 8 and 9 are two schematic front views of the air intake unit of FIG. 6 with the shutter device in a closed position and in an open position, respectively.
Figure 8:
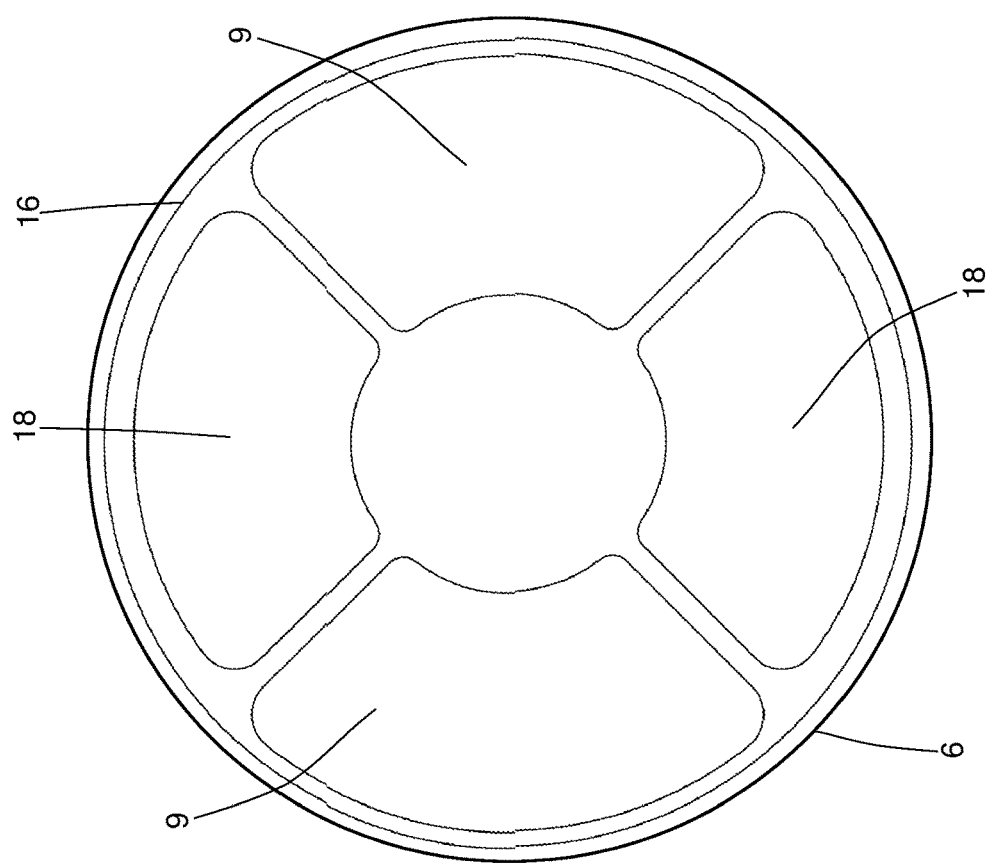
Figure 10:
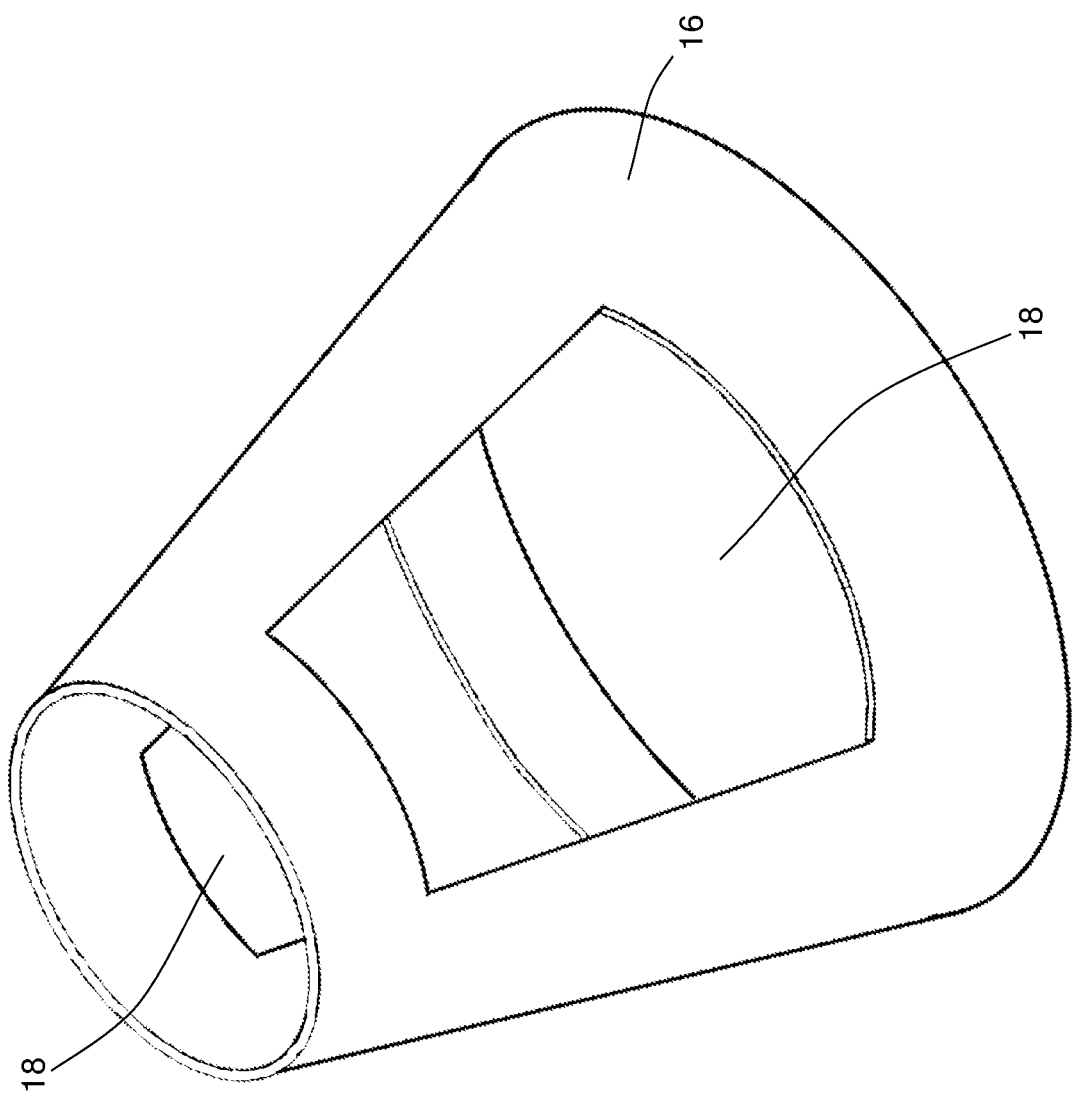
FIG. 10 is a schematic perspective view of an element of the shutter device of the air intake unit of FIG. 6.

According to FIGS. 4 and 5, the intake unit 3 comprises a tubular housing 4, which has a longitudinal symmetry axis 5 and is provided with an outer wall 6, which delimits the space enclosed by the tubular housing 4.

The air intake unit 3 comprises an inlet opening 7, which is made through the outer wall 6 of the tubular housing 4 and through which the external air needed for the operation of the turbine engine 2 can be taken in; in other words, the external air needed for the operation of the turbine engine 2 can get into the tubular housing 4 flowing through the inlet opening 7 and, once inside the tubular housing 4, it can reach the turbine engine 2. In the embodiment shown in FIG. 4, the intake unit 3 comprises one single inlet opening 7, but, according to other embodiments which are not shown herein though are perfectly equivalent, the intake unit 3 comprises different inlet openings 7 arranged beside one another.

The intake unit 3 comprises an air filter 8, which is supported by the tubular housing 4 and completely engages the inlet opening 7 so as to filter the external air flowing through the intent opening 7 while getting into the tubular housing 4; in other words, the air filter 8 reproduces the shape of the inlet opening 7 so as to engage, without clearance, the inlet opening 7, thus filtering all the air flowing through the inlet opening 7 while getting into the tubular housing 4. In the embodiment shown in the accompanying figures, the air filter 8 has a tubular shape (wherein the filtering material is arranged in the area of the lateral wall). Preferably, the air filter 8 comprises a support frame with a cylindrical shape or with the shape of a truncated cone (made of aluminium, plastic material or composite material), which is fixed to the outer wall 6 of the tubular housing 4 and supports different curved panels of filtering material (for example made of fabric or cotton nonwoven fabric or other fibres, enclosed between two layers of a thin metal net, which give shape and resistance to the filtering material).

It should be pointed out that the filtering material of the air filter 8 permits a passage (flow, crossing, inlet) of air both in an axial direction and in a radial direction, which means that air can pass through the filtering material both flowing in an axial direction (i.e. parallel to the longitudinal symmetry axis 5) and flowing in a radial direction (i.e. perpendicularly to the longitudinal symmetry axis 5).

The intake unit 3 comprises a pair of inlet openings 9, each made through the outer wall 6 of the tubular housing 4 and completely separate from and independent of the inlet opening 7 and the air filter 8. Through the inlet openings 9 the external air needed for the operation of the turbine engine 2 can be taken in; in other words, the external air needed for the operation of the turbine engine 2 can get into the tubular housing 4 flowing through the inlet openings 9 and, once inside the tubular housing 4, it can reach the turbine engine 2. In the embodiment shown in FIG. 4, the intake unit 3 comprises two inlet openings 9, but, according to other embodiments which are not shown herein though are perfectly equivalent, the intake unit 3 comprises one single inlet opening 9 or more than two inlet openings 9 arranged beside one another.

As already mentioned above, the air filter 8 has a tubular shape, in which the filtering material is arranged in the area of the lateral wall, and has—at the front and at the back— respective free openings: the front opening permits the passage of the air coming from the two inlet openings 9, whereas the rear opening allows the air taken in to flow towards the turbine engine 2.

The intake unit 3 comprises a shutter device 10, which is arranged inside the tubular housing 4, is coupled to each inlet opening 9 and is movable between a closed position (shown in FIG. 4), in which it closes the inlet opening 9 (so as to prevent air from flowing in through the inlet opening 9), and a closed position (shown in FIG. 5), in which it sets the passage through the inlet opening 9 free (in order to allow air to flow through the inlet opening 9).

Finally, the intake unit 3 comprises an actuator 11 (for example an electric motor or a pneumatic or hydraulic cylinder), which moves the shutter device 10 between the closed position and the open position.

When the shutter device 10 is in the closed position (shown in FIG. 4), the external air can get into the tubular housing 4 (and, hence, reach the turbine engine 2) only by flowing through the inlet opening 7 and, therefore, passing through the air filter 8. On the other hand, when the shutter device 10 is in the open position (shown in FIG. 5), the external air can get into the tubular housing 4 (and, hence, reach the turbine engine 2) both by flowing through the inlet opening 7 and, therefore, passing through the air filter 8 and by flowing through the inlet openings 9 and, hence, without flowing through the air filter 8 (as the inlet openings 9 are not provided with filtering material, they do not have any obstacle to the passage of air). Obviously, when the shutter device 10 is in the open position (shown in FIG. 5), almost all the air getting into the tubular housing 4 in order to reach the turbine engine 2 flows through the inlet openings 9 rather than through the inlet opening 7 engaged by the air filter 8, as flowing through the inlet openings 9 leads to smaller losses of load.

When the shutter device 10 is in the closed position (shown in FIG. 4), the air taken in necessarily flows through the inlet opening 7 and through the air filter 8; therefore, possible impurities present in the air are held back by the air filter 8, but, on the other hand, the passage through the air filter 8 determines, in the air taken in, a loss of load which jeopardizes the performances of the turbine engine 2. When the shutter device 10 is in the open position (shown in FIG. 5), instead, the air taken in mainly flows through the inlet openings 9 and possible impurities present in the air are not held back by the air filter 8; hence, there is no loss of load in the air taken in, but, on the other hand, possible impurities present in the air are not held back by the air filter 8.

According to FIGS. 4 and 5, there is provided an electronic control unit 12, which controls the operation of the air intake unit 3 and, among other things, controls the actuator 11 so as to have it move the shutter device 10 between the closed position (shown in FIG. 4) and the open position (shown in FIG. 5). In particular, when the helicopter 1 is close to the ground (during take-off or landing or when it stops at a low altitude), the air taken in can (likely) contain impurities and, therefore, the shutter device 10 is moved to and kept in the closed position by the electronic control unit 12, so as to filter the air taken in; on the other hand, when the helicopter 1 flies high (i.e. far from the ground, for example at an altitude of some dozens of metres), the air taken in very unlikely contains impurities and, therefore, the shutter device 10 is moved to and kept in the open position by the electronic control unit 12, so as to avoid (uselessly) jeopardizing the performances of the turbine engine 2.

Furthermore, the electronic control unit 12 is connected to a pressure sensor 13, which is arranged in the tubular housing 4 downstream of the filtering material of the air filter 8 and measures the pressure of the air taken in after it has flown through the air filter 8; when the pressure of the air take in, measured by the pressure sensor 13, is below a threshold value, the shutter device 10 is moved to and kept in the open position (shown in FIG. 5) by the electronic control unit 12, regardless of the proximity of the helicopter 1 to the ground. In other words, the pressure of the air taken in, measured by the pressure sensor 13, indicates the clogging of the air filter 8, since the more the air filter 8 is clogged, the lower the pressure of the air taken in, measured by the pressure sensor 13, is; therefore, when the air filter 8 is too clogged, namely when the pressure of the air taken in, measured by the pressure sensor 13, is below a threshold value, the shutter device 10 is moved to and kept in the open position (shown in FIG. 5) by the electronic control unit 12, so as to avoid excessively jeopardizing the performances of the turbine engine 2.

In the embodiment shown in the accompanying figures, the tubular housing 4 has a front portion 14, which is ogive-shaped and through which the inlet openings 9 are obtained, and a rear portion 15, which has the shape of a truncated cone and through which the inlet opening 7 is obtained; therefore, in the embodiment shown in the accompanying figures, the inlet openings 9 are arranged in a front position and, hence, in front of the inlet opening 7, which is arranged in the rear position. According to other embodiments, which are not shown herein, the inlet opening 7 is arranged in a front position and, therefore, in front of the inlet openings 9, which are arranged in a rear position. It should be pointed out that, as the helicopter 1 moves forward, the front position allows openings to intercept, given the same surface, a greater quantity of air and, therefore, the inlet openings 9 arranged in the front position take more advantage of this than the inlet opening 7 arranged in the rear position.

The ogive shape of the front portion 14 indicates a tapered surface, which is designed to offer a minimum fluid-dynamic resistance (namely, an excellent aerodynamic penetration); generally speaking, the ogive shape of the front portion 14 has an axial symmetry and is obtained through the rotation, around the longitudinal axis 5, of a circle arc or of another sundial line tangent to the generatrix of the cylindrical part; it fulfils the aim of providing the projectile itself with a tapered shape. According to a possible embodiment, the ogive shape of the front portion 14 could also not have a perfect symmetry around the longitudinal axis 5, which means that it could be slightly flattened; in other words, the ogive shape of the front portion 14 could also be deformed and, therefore, without the perfect symmetry around the longitudinal axis 5.

To sum up, the tubular housing 4 has, as a whole, a conical shape having the longitudinal symmetry axis 5 parallel to the flying direction of the helicopter 1; the tubular housing 4 with a conical shape comprises the front portion 14, which is ogive-shaped and through which the inlet openings 9 are obtained, and the rear portion 15 with the shape of a truncated cone, through which the inlet opening 7 engaged by the air filter 8 is obtained. The shape of a truncated cone of the air filter 8 increases the filtering surface, given the same outer dimensions, and leads to a projection of the filtering surface normal to the direction of the motion; therefore, said filtering surface can recover pressure from the speed of the helicopter 1 (i.e. it can benefit from the so-called "RAM" effect, which increases the static intake pressure exploiting the dynamic pressure generated by the forward movement of the helicopter 1). The ogive shape of the front portion 14 leads to a reduction in the aerodynamic resistance of the air intake unit 3 with the system in filtering configuration; furthermore, the inlet openings 9 made in the ogive-shaped front portion 14 allow pressure to be recovered from the speed of the helicopter 1 (thus taking advantage of the so-called "RAM" effect, which increases the static intake pressure exploiting the dynamic pressure generated by the forward movement of the helicopter 1).

It should be point out that the air filter 8 can recover greater pressure from the speed of the helicopter 1 (i.e. can better benefit from the so-called "RAM" effect, which increases the static intake pressure exploiting the dynamic pressure generated by the forward movement of the helicopter 1) thanks to the fact that the filtering material of the air filter 8 permits a passage of air both in an axial direction and in a radial direction.

In the embodiment shown in the accompanying figures, the rear portion 15 of the tubular housing 4 has the shape of a truncated cone; as a consequence, the inlet opening 7 and the air filter 8 engaging the inlet opening 7 have the shape of a truncated cone as well (with the smaller base at the front and the larger base at the back). According to a different embodiment, which is not shown herein, the rear portion 15 of the tubular housing 4 has a cylindrical shape; as a consequence, the inlet opening 7 and the air filter 8 engaging the inlet opening 7 have a cylindrical shape as well.

The shutter device 10 comprises, for each inlet opening 9, a corresponding partition 16, which is movable between the open position (shown in FIG. 4) and the closed position (shown in FIG. 5). In particular, each partition 16 is hinged so as to rotate around a rotation axis 17 between the open position and the closed position.

In embodiment shown in FIGS. 4 and 5, the two partitions 16 are separate from one another (i.e. they consist of respective elements having their own moving members) and rotate around respective rotation axes 17, which are parallel to one another and are transverse to the longitudinal symmetry axis 5 of the tubular housing 4. Basically, in the embodiment shown in FIGS. 4 and 5, each partition 16 is a panel reproducing the shape of the corresponding inlet opening 9 or is slightly larger than the inlet opening 9 itself.

In the embodiment shown in FIGS. 6-10, the two partitions 16 form a single tubular body (shown separately in FIG. 10) with the shape of an ogive (namely, shaped like the front portion 14 of the tubular housing 4), which is arranged inside the front portion 14 of the tubular housing 4 in contact with the outer wall 6 of the tubular body 4. In this embodiment, the rotation axis 17 of the two partitions 16 is coaxial to the longitudinal axis 5 of the tubular housing 4. Furthermore, in this embodiment, each partition 16 comprises a through hole 18, which, in the closed position (shown in FIGS. 6 and 8), is far from the corresponding inlet opening 9 and, in the open position (shown in FIGS. 7 and 9), overlaps the corresponding inlet opening 9.

According to a possible (though not binding) embodiment, in the area of each intake opening 9 there can be arranged a metal grid with relatively large meshes (in the range of one or two centimetres), which fulfils the function of preventing birds from flying into the air intake.

Figure 11:
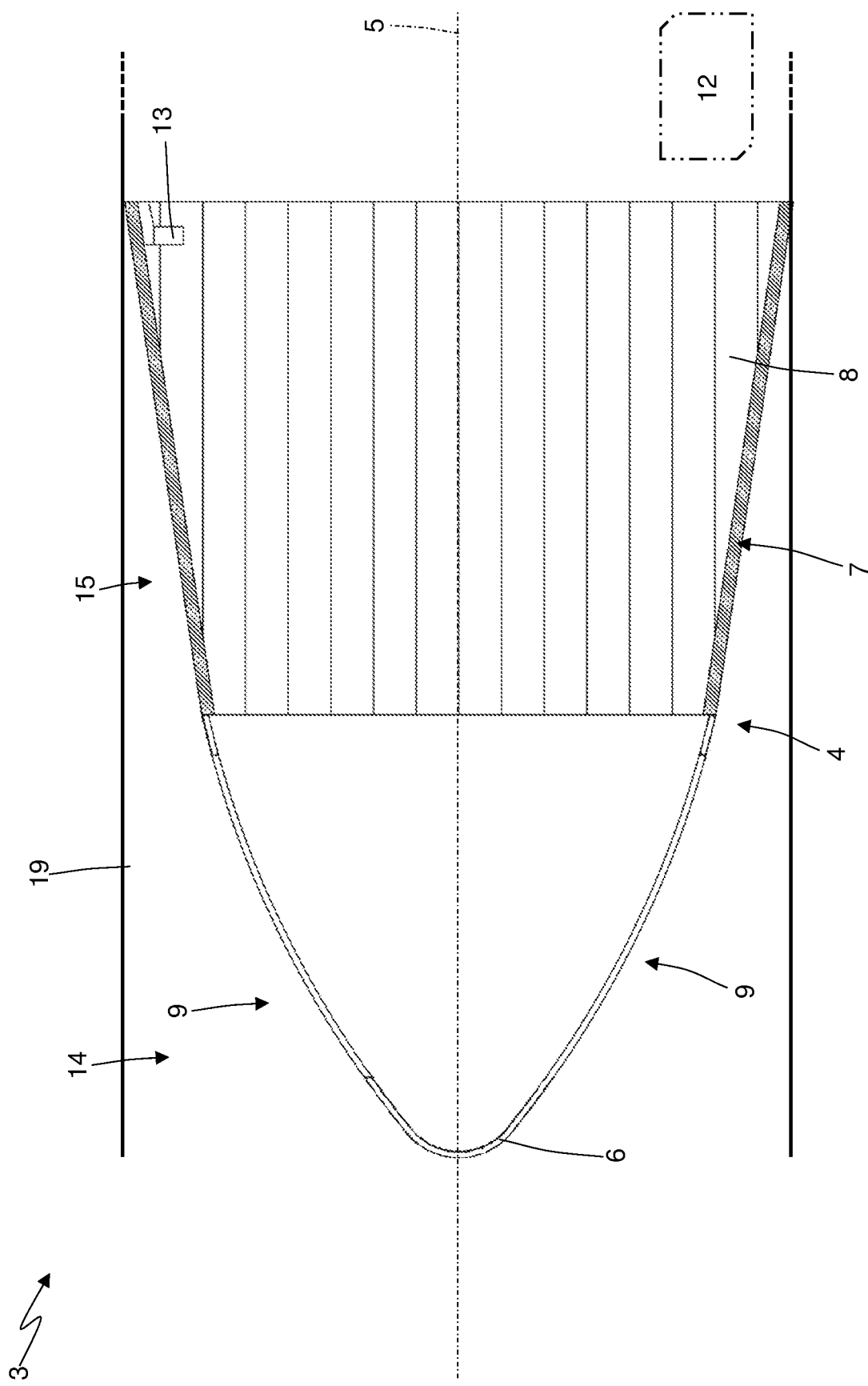
FIGS. 11, 12 and 13 are three schematic views, with longitudinal sections, of alternative embodiments of the air intake unit of FIG. 1.
Figure 12:
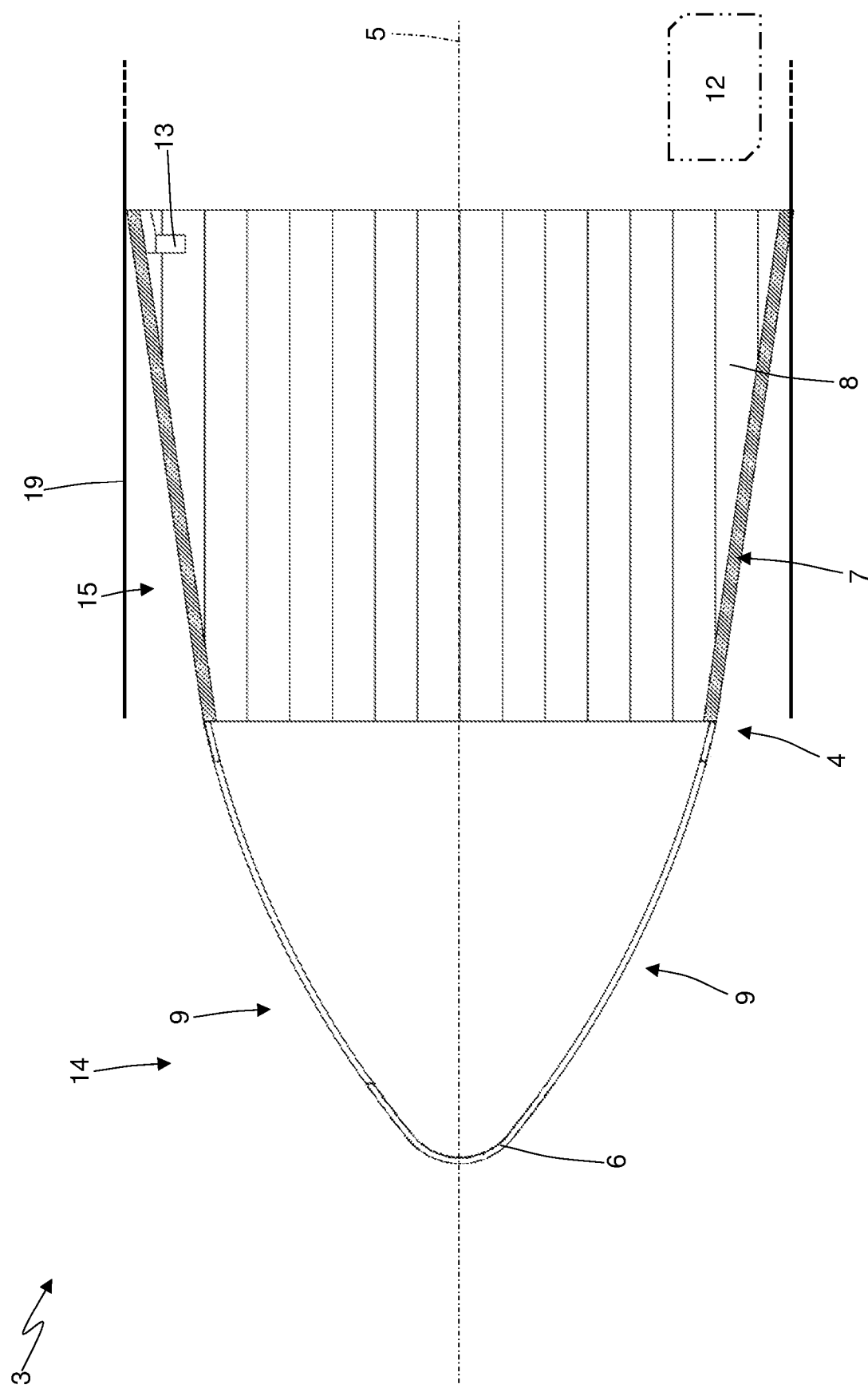
Figure 13:
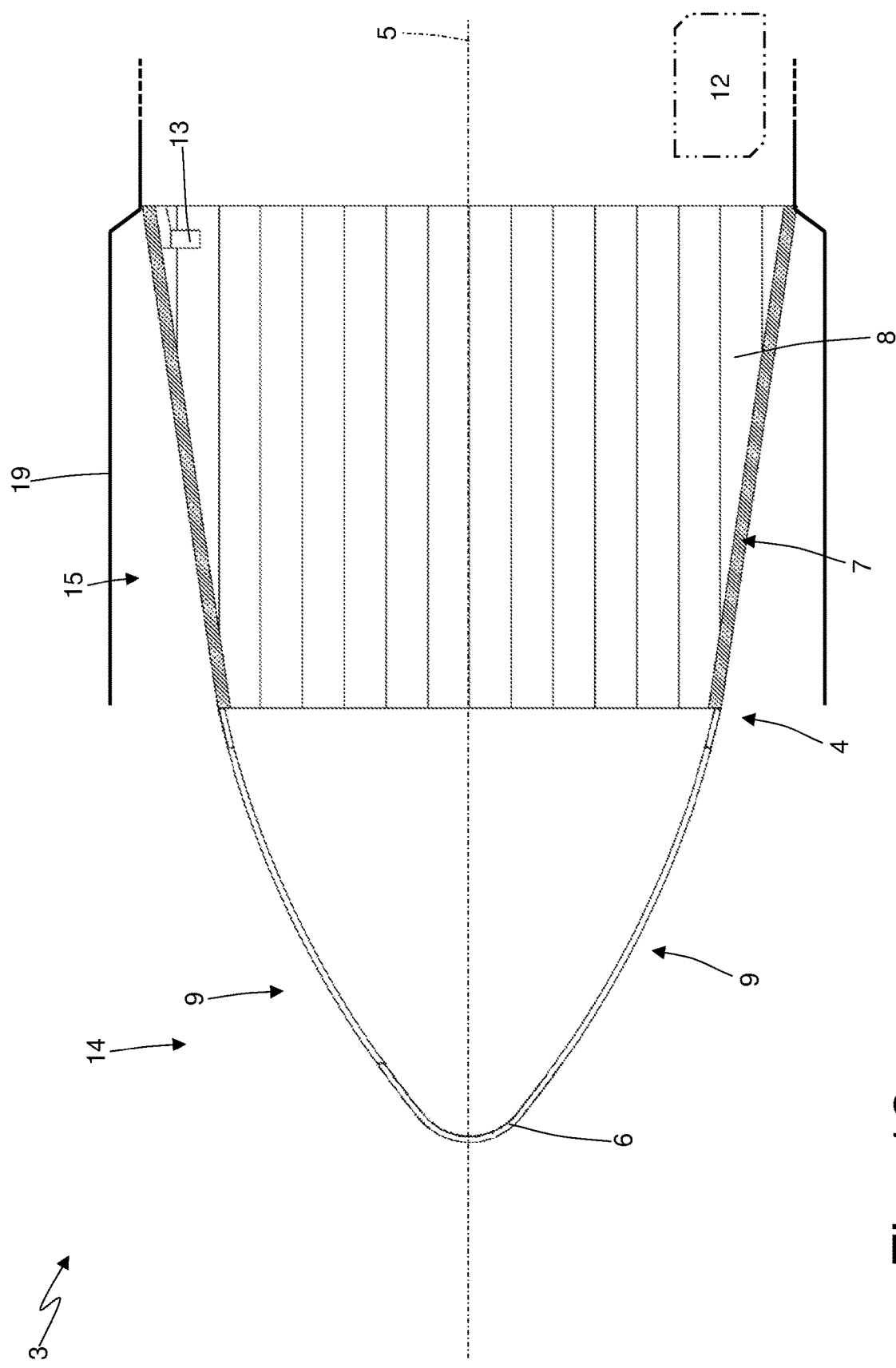

In the alternative embodiments shown in FIGS. 11, 12 and 13, the air intake unit 3 comprises an outer tubular body 19 with a cylindrical shape, which at least partially surrounds the tubular housing 4: in the embodiment shown in FIG. 11, the outer body 19 completely surrounds the tubular housing 4 (i.e. the entire tubular housing 4 is contained in the outer body 19), whereas, in the embodiment shown in FIGS. 12 and 13, the outer body 19 only partially surrounds the tubular housing 4 (i.e. only part of the tubular housing 4 is contained in the outer body 19). In particular, the outer body 19 contains at least the rear portion 15 of the tubular housing 4, so that the air filter 8 (namely, the inlet opening 7) is contained in the outer body 19. The function of the outer body 19 is that of increasing the dynamic pressure close to the air filter 8, so as to increase the efficiency of the air filter 8 (namely, in order to increase the air flow rate flowing through the air filter 8). The outer body 19 can have an inner diameter equal to the maximum outer diameter of the air filter 8 (as you can see in FIGS. 11 and 12) or it can have an inner diameter greater than the maximum outer diameter of the air filter 8 (as you can see in FIG. 13). Obviously, the presence of the outer body 19 can be combined both with the conformation of the partitions 16 shown in FIGS. 4 and 5 and with the conformation of the partitions 16 shown in FIGS. 6-10.

In the embodiments shown in FIGS. 4-13, the partitions 16, which engage the inlet openings 9, open towards the inside of the tubular housing 4, which means that in the open position the partitions 16 are completely inside the tubular housing 4. In the alternative embodiment shown in FIGS. 14-17, the partitions 16, which engage the inlet openings 9, open towards the outside of the tubular housing 4, which means that in the open position the partitions 16 are completely outside the tubular housing 4. Opening the partitions 16 towards the outside of the tubular housing 4 reduces the obstacles to be overcome by the air getting into the tubular housing 4, as the partitions 16 (which are completely on the outside of the tubular housing 4) do not interfere in any way with the air flow inside the tubular housing 4. Furthermore, having the partitions 16 open towards the outside of the tubular housing 4 increases the quantity of air getting into the inlet openings 9, as the partitions 16 (which are completely on the outside of the tubular housing 4) act like deflectors that direct the air towards the inlet openings 9.

According to a preferred embodiment, on the inside of the tubular housing 4 there is arranged a deflector body 20, which deflects the air entering from the inlet openings 9 towards an intake of the engine 2; in other words, the direction of movement of the air entering from the inlet openings 9 tends to have a significant radial component and the function of the deflector body 20 is that of causing the direction of movement of the air entering from the inlet openings 9 to only have an axial component, thus minimizing the generation of turbulences (which reduce the air flow rate entering from the inlet openings 9). On the inside of the tubular housing 4 there is inserted the conical deflector body 20 (for example having a reverse elliptical shape, as you can see in the accompanying figures), which guides the air flow from the inlet openings 9 to the intake of the engine 2 limiting (reducing to zero) turbulences, especially those turbulences generated by a possible part of "static" air (i.e. air located in areas that are not directly affected by the flow).

According to a preferred embodiment, the deflector body 20 (which, in the most generic form, resembles a cone) is also used to contain the actuator 11 that moves the partitions 16 of the shutter device 10 between the closed position and the open position. Furthermore, the deflector body 20 can also be used to contain the sensors needed for monitoring of the conditions of the air filter 8 (for example the pressure sensor 13 arranged in the tubular housing 4 downstream of the filtering material of the air filter 8 and designed to measure the pressure of the air taken in after it has flown through the air filter 8).

The movement of the partitions 16 from the closed position (shown in FIG. 14) to the open position (shown in FIGS. 15, 16 and 17) and vice versa (namely, the opening and the closing of the partitions 16) can be take place through a rotation-translation movement (shown in FIG. 15), through a mere rotation movement (shown in FIG. 16) or through a mere translation movement (shown in FIG. 17). Generally speaking, the rotation-translation movement (shown in FIG. 15) is preferable, as it permits the use of double-curvature partitions 16, which hardly work correctly with simple hinges (or, worse, with simple translations); to this regard, it should be pointed out that the double curvature is important to optimize the overall aerodynamic behaviour of the tubular housing 4.

In case of rotation-translation movement (shown in FIG. 15) or of mere rotation movement (shown in FIG. 16), each partition 16 rotates between the open position and the closed position around the rotation axis 17, which is transverse to the longitudinal symmetry axis 5 of the tubular housing 4 and is arranged in the area of a rear end of the partition 16. Obviously, each rotation axis 17 can be fixed (mere rotation movement, shown in FIG. 16) or movable (rotation-translation movement, shown in FIG. 15).

Computational fluid dynamics analyses revealed that, especially in case of high flying speed, the air flow can find it difficult to get into the inlet openings 9 in the presence of partitions 16 opening towards the inside of the tubular housing 4, as the air flow is negatively affected by the turbulences created inside the tubular housing 4 by the partitions 16 standing in the open position (namely, by the partition 16 that are retracted inside the tubular housing 4). Furthermore, thanks to the movement towards the outside of the tubular housing 4, the partitions 16 become flow deflectors that channel the air towards the inlet openings 9.

Thanks to the presence of the partitions 16 opening towards the outside of the tubular housing 4 and of the deflector body 20, it is possible to obtain high performances both under filtering conditions (namely, with the partitions 16 in the closed position and the air taken in flowing through the inlet opening 7 engaged by the air filter 8) thanks to the outer aerodynamic optimization of the tubular housing 4 and (in an even more advantageous manner) under free intake conditions (namely, with the partitions 16 in the open position and the air taken in flowing through the inlet openings 9 as much as possible), thus reducing consumptions and improving the performances of the engine 2.

The embodiment shown by mere way of example in the accompanying drawings relates to a turbine engine 2, but the invention can find advantageous application in any other type of aircraft engine.

It should be pointed out that the air intake unit 3 described above can be coupled to the main engine of the helicopter 1 or to an auxiliary engine of an auxiliary power unit (APU); in other words, the air intake unit 3 described above can be used in any situation in which fresh air needs to be sucked in from the outside for the operation of the engine of the helicopter 1.

The embodiment shown by mere way of example in the accompanying drawings relates to a helicopter 1, but the invention can find advantageous application in any type of aircraft, hence also an airplane.

The embodiments described herein can be combined with one another, without for this reason going beyond the scope of protection of the invention.

The air intake unit 3 described above has numerous advantages.

First of all, air intake unit 3 described above allows the aircraft 1 to safely operate in areas with a lot of dust (hence, in areas where the air close to the ground is rich in impurities raised both by natural wind and by air currents generated by the movement of the aircraft 1) thanks to the presence of the air filter 8, which, when needed, is operated (by moving the shutter device 10 to the closed position) so as to preventively filter the air taken in by the turbine engine 2.

Furthermore, the air intake unit 3 described above can operate, almost for the entire flight, without having its performances jeopardized, because, when the aircraft 1 flies high (i.e. relatively far from the ground), the air filter 8 is bypassed (by moving the shutter device 10 to the open position).

It should be pointed out that, thanks to the shape of a truncated cone of the air filter 8, the air taken in through the air filter 8 (i.e. through the inlet opening 7) can benefit from a dynamic effect (also called "RAM" effect), which allows static intake pressure to be increased exploiting the dynamic pressure generated by the forward movement of the helicopter 1. In the same way, thanks to the front position of the inlet opening 9, the air taken in through the inlet opening 9 (obviously, when the shutter device 10 is in the open position) can also benefit from a dynamic effect (also called "RAM" effect), which allows static intake pressure to be increased exploiting the dynamic pressure generated by the forward movement of the helicopter 1. In this way, the intake efficiency of the air intake unit 3 is always high, both when the shutter device 10 is in the open position and when the shutter device 10 is in the closed position.

Furthermore, when the shutter device 10 is in the closed position, the ogive-shaped front portion 14 causes both a minimization of the aerodynamic resistance of the air intake unit 3 and a reduction in the generation of vortices in the area of the air filter 8 (a vortex air flow significantly decreases the dynamic effect—"RAM" effect—which increases static intake pressure exploiting the dynamic pressure generated by the forward movement of the helicopter 1).

To sum up, the air intake unit 3 described above leads to an optimization of the dynamic effect ("RAM" effect) both for the air flowing through the inlet opening 7 (i.e. through the air filter 8) and for the air flowing through the inlet opening 9 (i.e. bypassing the air filter 8), thus minimizing aerodynamic resistance at the same time in both conditions.

Finally, the air intake unit 3 described above is easy and cheap to be manufactured, as the movements of the shutter device 10 can be obtained in a simple manner and with components that are available in the market.

LIST OF THE REFERENCE NUMBERS OF THE FIGURES 1 helicopter
2 engine
3 air intake unit
4 tubular housing
5 longitudinal axis
6 outer wall
7 inlet opening
8 air filter
9 inlet opening
10 shutter device
11 actuator
12 electronic control unit
13 pressure sensor
14 front portion
15 rear portion
16 partition
17 rotation axis
18 through hole
19 outer body
20 deflector body

The invention claimed is:

1. An air intake unit (3) for an engine of an aircraft (1); the intake unit (3) comprises:
    a tubular housing (4), which has a longitudinal symmetry axis (5), is provided with an outer wall (6) delimiting the space enclosed by the tubular housing (4), and has a front portion (14) and a rear portion (15);
    at least one first inlet opening (7) which is obtained in the rear portion (15) through the outer wall (6) of the tubular housing (4) and through which the external air needed to operate the engine (2) can be taken in;
    at least one air filter (8) which is supported by the tubular housing (4) and engages the first inlet opening (7), so as to filter the external air flowing through the first inlet opening (7);
    at least one second inlet opening (9) which is obtained in the front portion (14) through the outer wall (6) of the tubular housing (4), is separate from and independent of the first inlet opening (7) and the air filter (8), and through which the external air needed to operate the engine (2) can be taken in;
    a shutter device (10) which is coupled to the second inlet opening (9) and is movable between a closed position, in which it closes the second inlet opening (9), and an open position, in which it sets the passage through the second inlet opening (9) free; and
    an actuator (11), which moves the shutter device (10) between the closed position and the open position;
    wherein the filtering material of the air filter (8) is arranged in the area of a side wall of the air filter (8), allows an air crossing both in axial direction and in radial direction with respect of the longitudinal symmetry axis (5), and has, on its front and rear side, respective free openings;
    wherein the rear portion (15) provided with the first inlet opening (7) has the shape of a truncated cone;
    wherein the air filter (8) engaging the first inlet opening (7) has the shape of a truncated cone; and
    wherein the front portion (14) provided with the second inlet opening (9) is ogive-shaped.

2. An air intake unit (3) according to claim 1, wherein the shutter device (10) is arranged inside the tubular housing (4).

3. An air intake unit (3) according to claim 1, wherein the shutter device (10) comprises a partition (16) which is movable between the open position and the closed position.

4. An air intake unit (3) according to claim 3, wherein the partition (16) is hinged so as to rotate around a rotation axis (17) between the open position and the closed position.

5. An air intake unit (3) according to claim 4, wherein the rotation axis (17) is transverse to a longitudinal symmetry axis (5) of the tubular housing (4).

6. An air intake unit (3) according to claim 4, wherein the rotation axis (17) is coaxial to a longitudinal symmetry axis (5) of the tubular housing (4).

7. An air intake unit (3) according to claim 6, wherein the partition (16) comprises a through hole (18), which, in the closed position, is far from the second inlet opening (9) and, in the open position, overlaps the second inlet opening (9).

8. An air intake unit (3) according to claim 7, wherein the partition (16) is ogive-shaped, reproducing the shape of the front portion (14) of the tubular housing (4), and is arranged inside the front portion (14) of the tubular housing (4) in contact with the outer wall (6) of the tubular housing (4).

9. An air intake unit (3) according to claim 3, wherein the shutter device (10) comprises at least one partition (16), which open towards the outside of the tubular housing (4), so that, in the open position, the partition (16) is completely arranged outside the tubular housing (4).

10. An air intake unit (3) according to claim 9, wherein, in the open position, the partition (16) is arranged so as to act as a deflector, which directs the air towards the second inlet opening (9).

11. An air intake unit (3) according to claim 9, wherein the actuator (11) moves the partition (16) between the open position and the closed position through a rotation-translation movement.

12. An air intake unit (3) according to claim 9, and comprising a deflector body (20) with a conical shape, which is arranged inside the tubular housing (4) and deflects the air flowing into the inlet opening (9) towards an intake of the engine (2).

13. An air intake unit (3) according to claim 12, wherein the deflector body (20) has a reverse elliptical shape.

14. An air intake unit (3) according to claim 12, wherein the deflector body (20) contains the actuator (11).

15. An air intake unit (3) according to claim 12, wherein the deflector body (20) contains at least one sensor (13) for monitoring the conditions of the air filter (8).

16. An air intake unit (3) according to claim 1 and comprising an outer body (9), which is tubular, has a cylindrical shape and surrounds, at least partially, the tubular housing (4) so that the tubular housing (4) is at least partially contained in the outer tubular body (9).

17. An air intake unit (3) according to claim 9, wherein the outer body (9) surrounds only the rear portion (15) of the tubular housing (4).

\* \* \* \* \*